US008369523B2

(12) United States Patent
Tepper

(10) Patent No.: US 8,369,523 B2
(45) Date of Patent: Feb. 5, 2013

(54) SURROGATE KEY GENERATION USING CRYPTOGRAPHIC HASHING

(75) Inventor: Clinton S. Tepper, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 573 days.

(21) Appl. No.: 12/624,547

(22) Filed: Nov. 24, 2009

(65) Prior Publication Data
US 2011/0123021 A1 May 26, 2011

(51) Int. Cl.
H04L 9/06 (2006.01)
H04L 29/06 (2006.01)
H04L 9/32 (2006.01)
G06F 17/30 (2006.01)

(52) U.S. Cl. ............................ 380/44; 380/247; 380/248
(58) Field of Classification Search .................. None
See application file for complete search history.

(56) References Cited

U.S. PATENT DOCUMENTS

| 6,163,774 | A  | * | 12/2000 | Lore et al. ............... 705/36 R |
| 7,497,370 | B2 |   | 3/2009  | Allen et al. |
| 7,500,150 | B2 |   | 3/2009  | Sharma et al. |
| 7,580,944 | B2 |   | 8/2009  | Zhuge et al. |
| 7,720,219 | B1 | * | 5/2010  | Olson et al. ................ 380/28 |
| 7,751,567 | B2 | * | 7/2010  | Quick et al. ................ 380/264 |
| 2005/0254658 | A1 | * | 11/2005 | Brown et al. ............... 380/286 |
| 2007/0127457 | A1 | * | 6/2007  | Mirtorabi et al. ............ 370/389 |
| 2008/0208897 | A1 | * | 8/2008  | Lew et al. ................. 707/103 R |
| 2009/0070237 | A1 | * | 3/2009  | Lew et al. ................. 705/28 |
| 2010/0076937 | A1 | * | 3/2010  | Abdelnur et al. ............ 707/679 |
| 2011/0113037 | A1 | * | 5/2011  | Wessling et al. ............ 707/747 |

OTHER PUBLICATIONS

"Encrypt: All you need to know about encryption. Best resource for encryption on the web.", 2009, http://www.encrypt.ro/2009/06, retrieved on May 31, 2012.*
Rivest R., "RFC1321: The MD5—Message Digest Algorithm", MIT Laboratory for Computer Science and RSA Data Security, Inc., Apr. 1992, http://tools.ietf.org/html/rfc1321.*
"Little endian vs. big endian", Apr. 2008, http://www.joerch.org/thoughts/endian.html, retrieved on May 31, 2012.*
Kimball, R., "Surrogate Keys", May 1998, http://www.kimballgroup.com/html/articles_search/articles1998/9805d05.html, retrieved on May 29, 2012.*

* cited by examiner

Primary Examiner — Philip Chea
Assistant Examiner — Dorianne Alvarado David
(74) Attorney, Agent, or Firm — John R. Pivnichny; Ronald A. D'Alessandro; Keohane & D'Alessandro PLLC

(57) ABSTRACT

The present invention relates to a method or system of generating a surrogate key using cryptographic hashing. One embodiment of the method of the present invention may have steps such as selecting a field or group of fields that is or are unique among all records in the database, for each record, extracting the data from the fields, concatenating the extracted data into an input message, running the input message through a hash generator, either in batches or one at a time, for testing purposes perhaps, and outputting a surrogate key.

14 Claims, 5 Drawing Sheets

_US 8,369,523 B2_

SURROGATE KEY GENERATION USING CRYPTOGRAPHIC HASHING

FIELD OF THE INVENTION

The present invention relates to a method or system of deterministically generating a surrogate key using cryptographic hashing.

BACKGROUND OF THE INVENTION

A surrogate key in a database is a unique identifier for either an entity in the modeled world or an object in the database. The surrogate key is not derived from application data. The problem is to deterministically generate a fixed length surrogate key without collisions. A collision or clash is a situation that occurs when two distinct pieces of data have the same hash value, checksum, fingerprint, or cryptographic digest. A cryptographic digest is a deterministic procedure that takes an arbitrary block of data and returns a fixed-size bit string, the cryptographic digest, such that an accidental or intentional change to the data will change the hash value. The data to be encoded is often called the "message", and the hash value is sometimes called the message digest or simply digest.

The ideal cryptographic hash function has four main properties:
  it is easy to compute the hash value for any given message,
  it is infeasible to find a message that has a given hash,
  it is infeasible to modify a message without changing its hash, and
  it is infeasible to find two different messages with the same hash.

Collisions maybe unavoidable whenever members of a very large set (such as all possible person names, or all possible computer files) are mapped to a relatively short bit string.

Prior art systems and methods tend to use variable length keys and may not be deterministic. That is, for sequential solutions of the prior art to the surrogate key problem, a key generated for two identical records may create two separate keys.

Therefore, there is a need to solve the problems associated as described above.

SUMMARY OF THE INVENTION

The deterministic method and system of the present invention may generate identical keys for identical records, thereby validating the data quality within a record and reducing data redundancy.

The present invention provides a system and at least one method for deterministically generating a fixed length surrogate key for a record in a database. Using a unique implementation of a publicly available cryptographic hashing algorithm named SHA-224. The system and method provides for the creation of a fixed length key from a variable length input message. The same input message will always generate the same key and a different input message generates a different key.

The present invention may include a method for generating a surrogate key using cryptographic hashing in a system having a database having records, the records having fields having data therein, the method may have the steps of selecting a field that is unique among all records in the database, for each record, extracting the data from the fields, concatenating the extracted data into an input message, running the input message through a hash generator and outputting a surrogate key.

The present invention may further include a system for generating a surrogate key using cryptographic hashing that may have a selecting component for selecting a field that is unique among all records in the database, an extracting component for extracting the data from the fields for each record, a concatenating component for concatenating the extracted data into an input message, a hash generator for hashing the input message and an outputting component for outputting a surrogate.

The present invention may further provide a computer program product embodied in a computer readable medium for operating in a system comprising a processing unit, a memory, a bus, input/output (I/O) interfaces, an application, the computer program product for implementing a method in a system for generating a surrogate key using cryptographic hashing, the method may have steps such as selecting a field that is unique among all records in the database, for each record, extracting the data from the fields, concatenating the extracted data into an input message, running the input message through a hash generator and outputting a surrogate key.

The present invention may further include a method for deploying a computing infrastructure comprising integrating computer-readable code into a computing system, wherein the code in combination with the computing system is capable of performing a process for generating a surrogate key using cryptographic hashing, the process may have steps such as selecting a field that is unique among all records in the database, for each record, extracting the data from the fields, concatenating the extracted data into an input message, running the input message through a hash generator and outputting a surrogate key.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE INVENTION

The present invention comprises a system and method for generating a surrogate key using cryptographic hashing. The system and method of the present invention provides for a method wherein several steps should be followed.

1) Selecting a field or group of fields that are unique among all records being put in the database. The length of the records does not matter, only the uniqueness.

2) For each record, extracting the data from these fields and concatenating them into an input message.

3) Running the input message through my hash generator either in batches or, for test purposes one at a time.

4) Outputting a surrogate key.

Essentially the hash key generator deterministically generates a fixed length unique surrogate key from variable length concatenated input fields.

Figure 1:
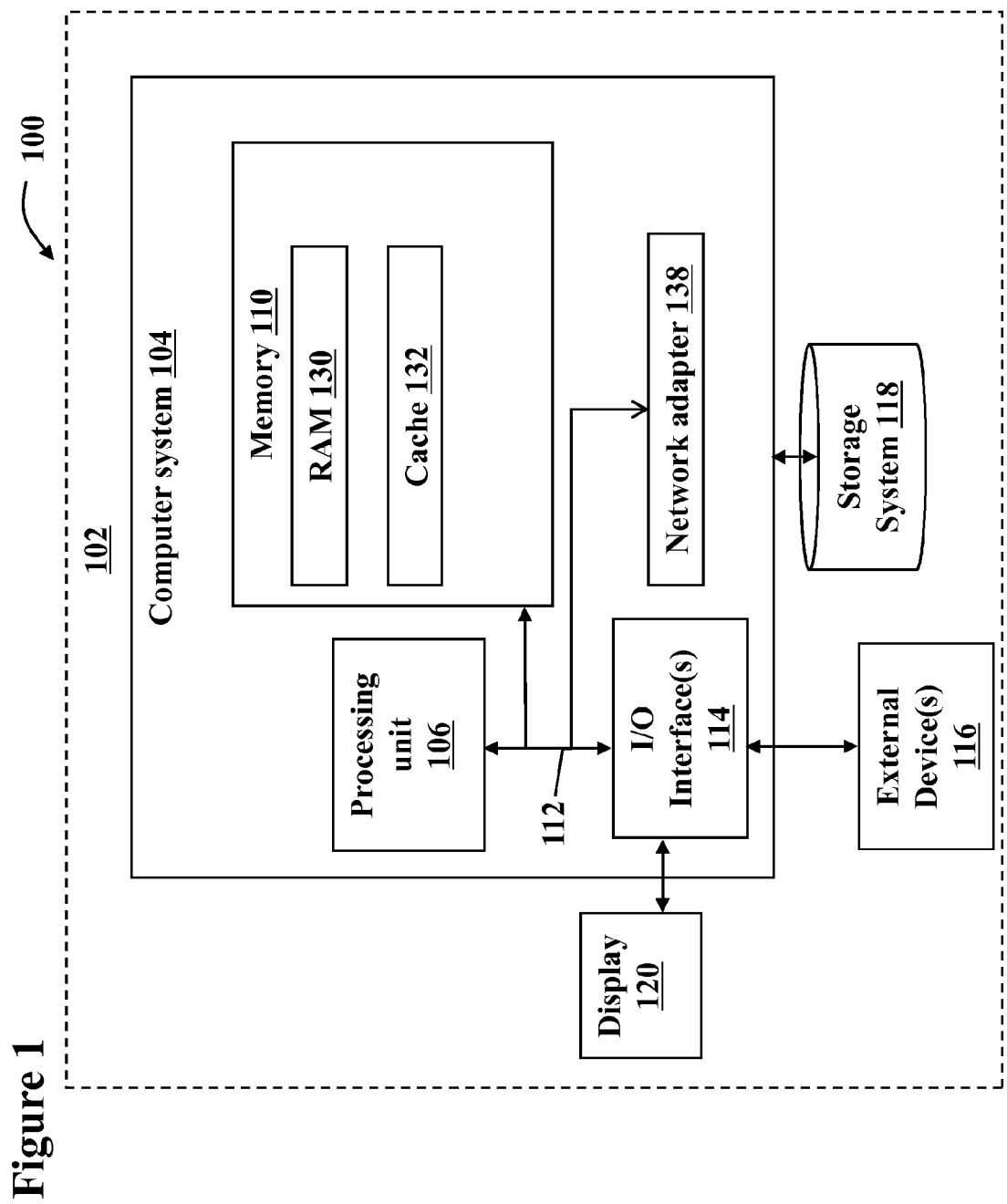
FIG. 1 shows a data processing system suitable for implementing an embodiment of the present invention.

FIG. 1 shows a system 100 that may have a data processing system 102 suitable for implementing an embodiment of the present invention. Data processing system 102 may have a computer system 104 connected to a display 120, external device(s) 116 and video camera 140 or other peripheral devices for providing a user an interface to computer system 140 being connected via I/O interface(s) 114. Computer system 104 may have an internal bus 112 for providing internal communication between such modules as processing unit 106, I/O interface(s) 114, network adapter 138 and memory 110. Memory 110 may have random access memory (RAM) 130, cache 132 and storage system 118 or other forms of memory. RAM may take the form of integrated circuits that allow stored data to be accessed in any order, that is, at random. Storage system 118 may take the form of tapes, magnetic discs and optical discs and are generally used for long term storage of data. Cache 132 is a memory for storing a collection of data-duplicating original values stored elsewhere or computed earlier, where the original data is expensive to fetch (owing to longer access time) or to compute, compared to the cost of reading the cache. In other words, a cache is a temporary storage area where frequently accessed data can be stored for rapid access. Once the data is stored in the cache, it can be used in the future by accessing the cached copy rather than re-fetching or re-computing the original data. A cache has proven to be extremely effective in many areas of computing because access patterns in typical computer applications have locality of reference.

Figure 2:
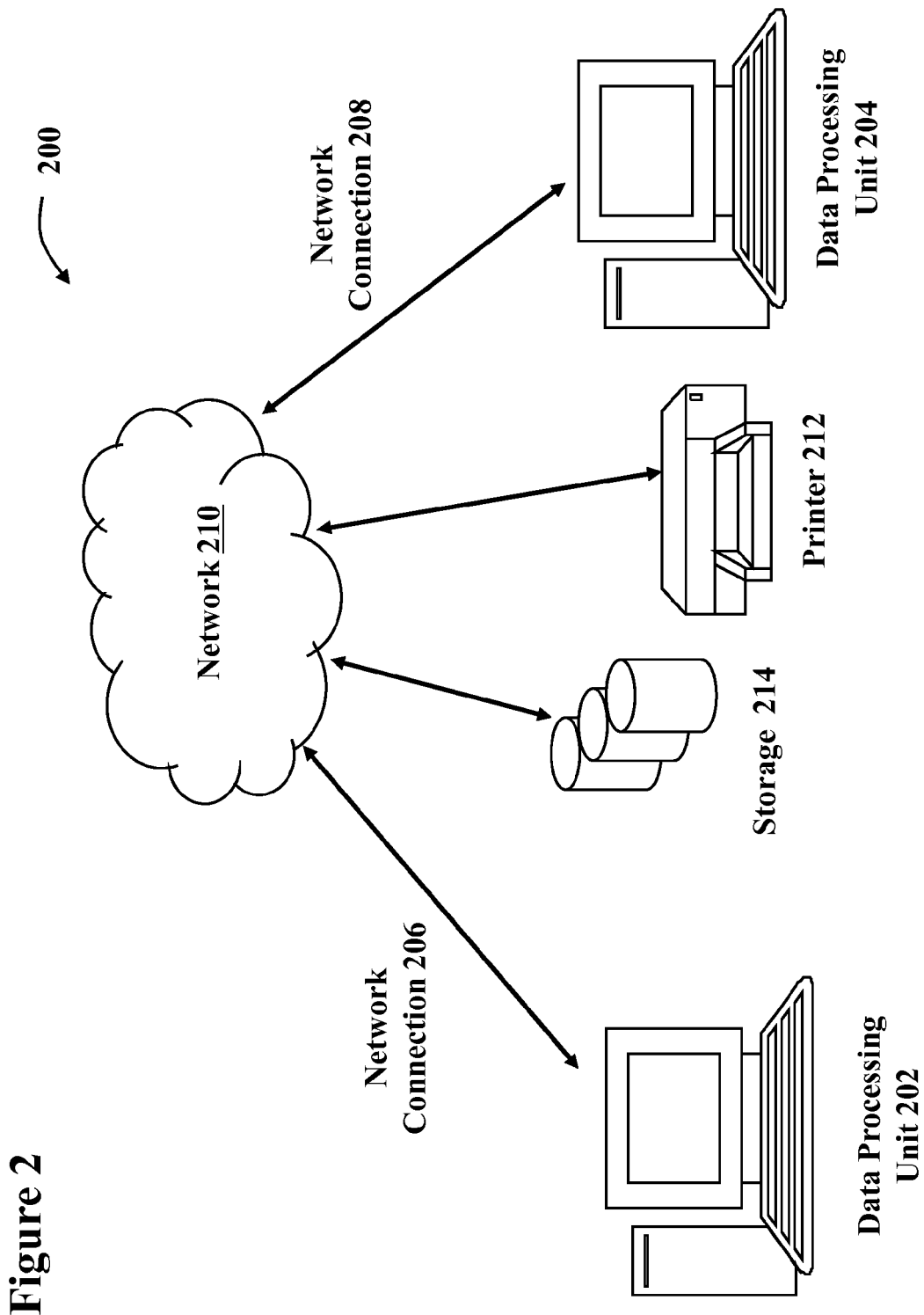
FIG. 2 shows a network for implementing an embodiment of the present invention.

FIG. 2 shows a network system 200 for implementing an embodiment of the present invention. Network system 200 may have a network 210 or group of interconnected computers, such as data processing units 202, 204, via network connections 206, 208 and may be of the type, e.g., a local area network (LAN) or internetwork. Printer 212 and storage 214 may be connected to network 210 via network connections 216, 218. Basic network components may include network interface cards, repeaters, hubs, bridges, switches and routers. Data processing units 202, 204 may be computers such as web servers or personal computers, or other user agents. A web server generally has hardware and software that are responsible for accepting HTTP requests from clients (user agents such as web browsers), and serving them HTTP responses along with optional data contents, which usually are web pages such as HTML documents and linked objects (images, etc.). In this document, the term "web browser" is used but any application for retrieving, presenting, and traversing information resources on the Internet must be considered.

Figure 3:
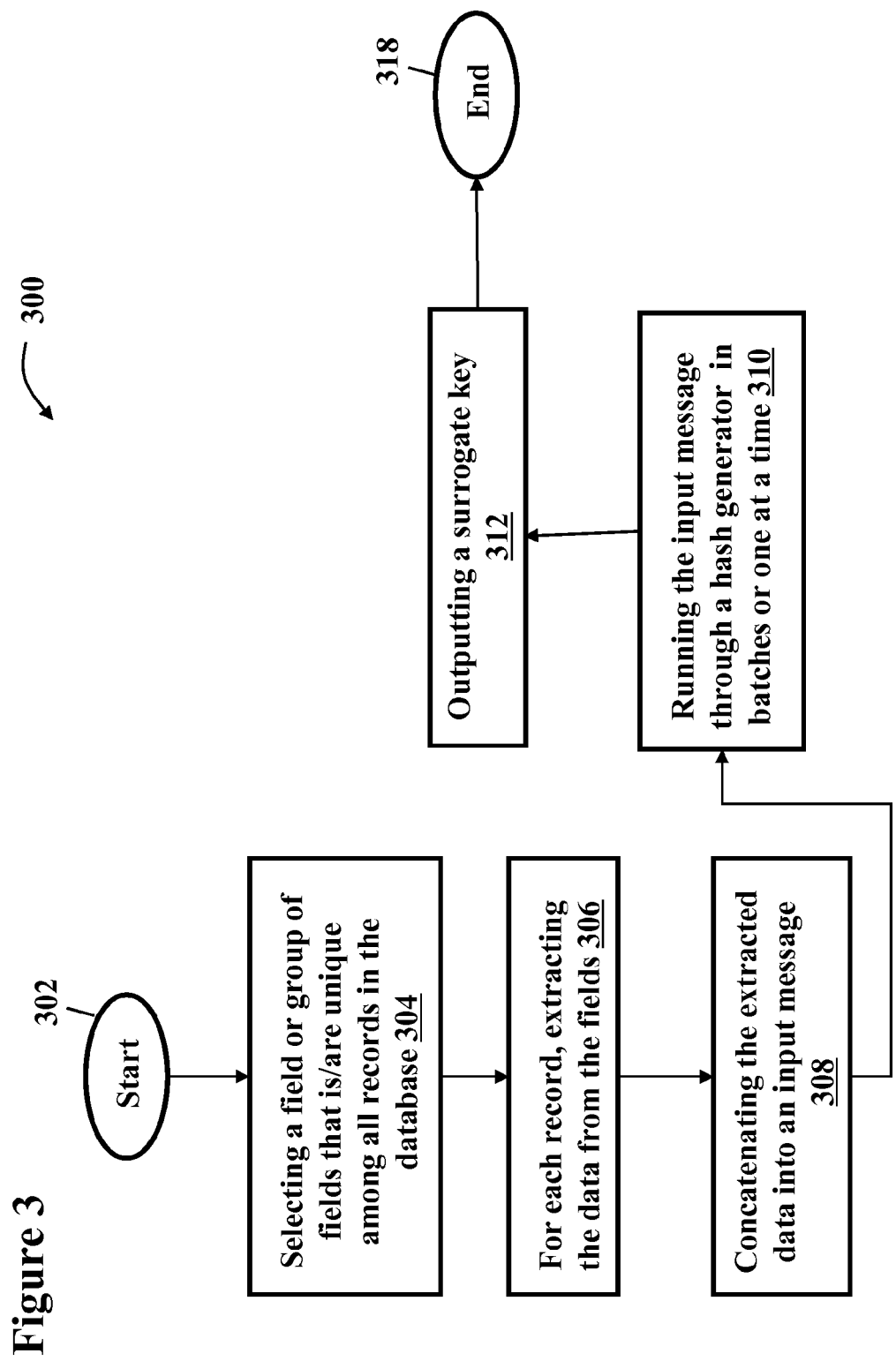
FIG. 3 illustrates an embodiment of a method of the present invention.
Figure 4:
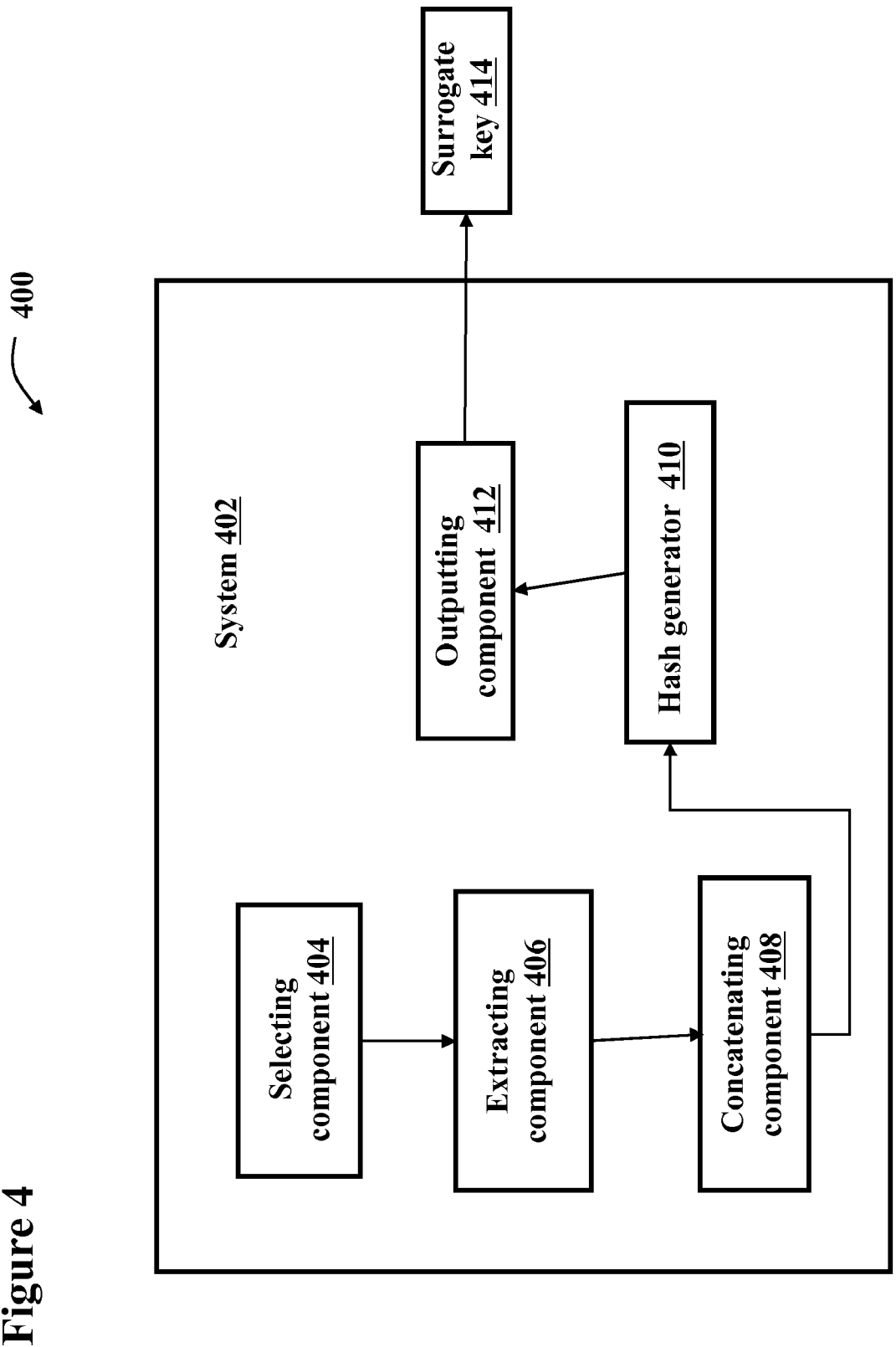
FIG. 4 illustrates an embodiment of a system of the present invention.

One embodiment 300 of the method of the present invention is shown in FIG. 3 which starts at 302. To use this methodology, several steps must be followed.

1) Select a field or group of fields that are unique among all records being put in the database. The length of the records does not matter, only the uniqueness.

2) For each record, extract the data from these fields and concatenate them together into an input message. Run the input message through my hash generator either in batches or, for test purposes one at a time. The output is then the surrogate key.

At 304, a field (or a group of fields) is/are selected that is/are unique among all records in the database. At 306, for each record, the data is extracted from the fields. At 308, the extracted data is concatenated into an input message. At 310, the input message is run through a hash generator in batches or one at a time for testing purposes. At 312, a surrogate key is output and the method ends at 314.

Essentially the hash key generator deterministically generates a fixed length unique surrogate key from variable length concatenated input fields.

Key points are:

The keys are collision proof, as long as the input text is unique. Two different inputs produce two different outputs, two of the same inputs produce the same outputs.

The length of the input message is arbitrary. It could be a word, it could be a book.

The algorithm is an implementation of the National Security Administration's SHA224 cryptographic hashing algorithm. The algorithm is public domain, and the implementation is of the present invention. The output message is 224 bit binary. This could be typecast to any desired data type.

Figure 5:
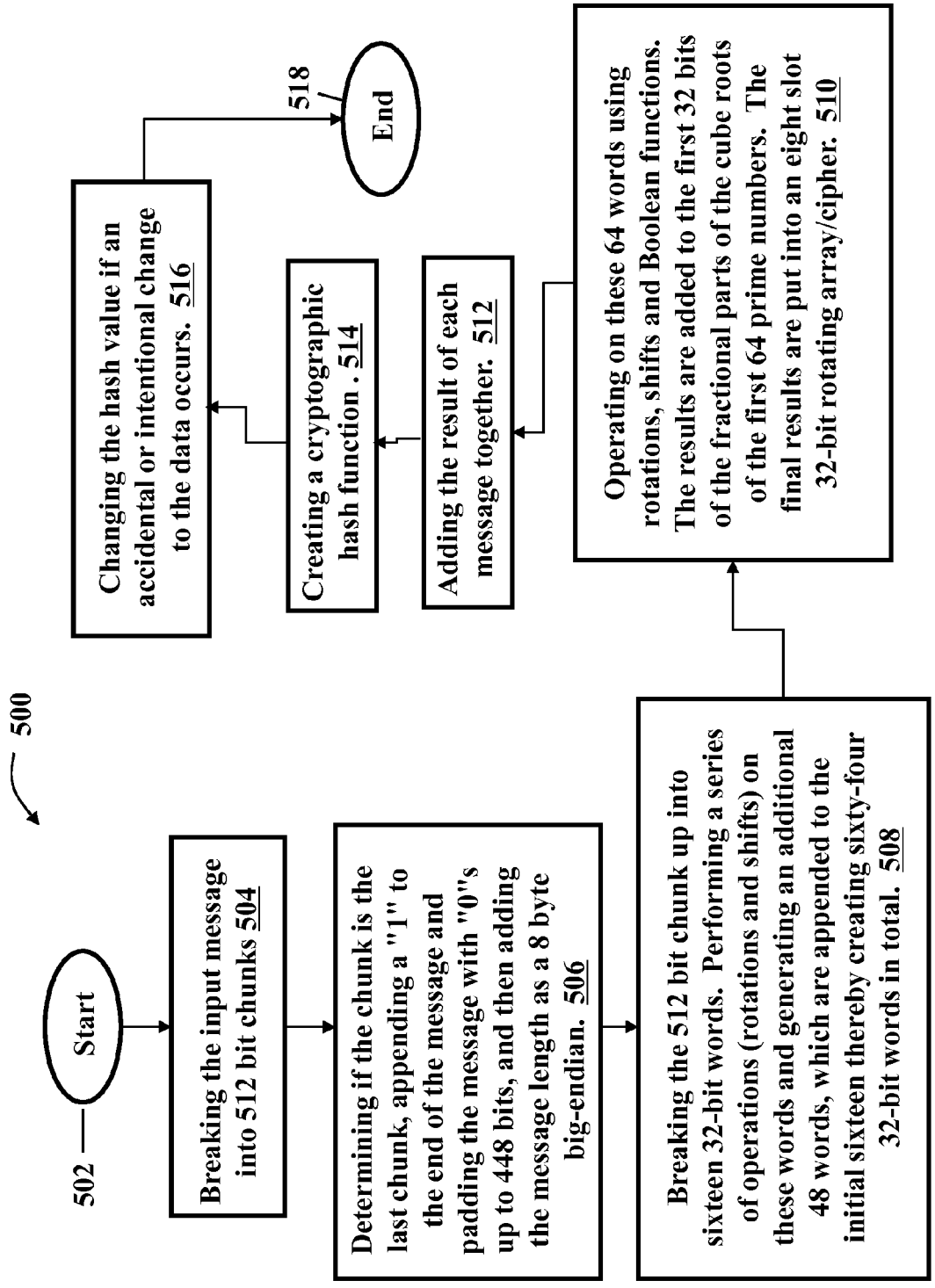
FIG. 5 illustrates another embodiment of the method of the present invention.

FIG. 5 illustrates an embodiment 500 of the method of the present invention that starts at 502:

1. At 504, an "eat" function breaks the input message into 512 bit chunks and runs the following steps on each chunk:

a. At 508, the system determines if the chunk is the last chunk, and if the chunk is the last chunk, a "1" is appended to the end of the message and the message is padded with "0"s up to 448 bits, where the message length as a 8 byte big-endian is added. Endianness is the byte (and sometimes bit) ordering used to represent some kind of data. Typical cases are the order in which integer values are stored as bytes in computer memory (relative to a given memory addressing scheme) and the transmission order over a network or other medium. When specifically talking about bytes, endianness is also referred to simply as byte order. The usual contrast is between most significant byte (or bit) first, called big-endian, and least significant byte (or bit) first, called little-endian.

b. The 512 bit chunk is broken up into sixteen 32-bit words at 508. A series of operations (rotations and shifts) are performed on these words that generate an additional 48 words, which are appended to the initial sixteen, creating sixty-four 32-bit words in total.

c. At 510, the algorithm operates on these 64 words using rotations, shifts and Boolean functions. The results are added to the first 32 bits of the fractional parts of the cube roots of the first 64 prime numbers. The final results are put into an eight slot 32-bit rotating array/cipher.

2. At 512, the algorithm adds the result of each message together (that is, the final array of eight 32-bit words).

3. At 514, a cryptographic hash function is created using the first seven words. A cryptographic hash function is a deterministic procedure that takes an arbitrary block of data and returns a fixed-size bit string, the (cryptographic) hash value, such that an accidental or intentional change to the data will change the hash value such as at 516. The method ends at 518.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation;

and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for generating a surrogate key using cryptographic hashing in a system having a database having records, the records
having fields having data therein, the method comprising:
selecting a field that is unique among all records in the database; for each record, extracting the data from the field;
concatenating the extracted data into an input message;
inputting the input message to a hash generator to perform the following:
break the input message into bit chunks;
break each bit chunk into initial words;
rotate and shift the initial words and generating additional words and append the additional words to the initial words to form a second set of words; and
form a third set of words by operating on the second set of words at least one of the following: rotations, shifts, and Boolean functions, for each of the third set of words, adding the first 32 bits of the fractional parts of the cube roots of the first 64 prime numbers to form final results for each message; and
outputting a surrogate key.

2. The method as defined in claim 1 further comprising running the input message in batches.

3. The method as defined in claim 1 further comprising running the input message one at a time.

4. The method as defined in claim 1 further comprising selecting a group of unique fields.

5. The method as defined in claim 1 further comprising determining if a bit chunk is the last chunk and, if a bit chunk is the last chunk, appending a "1" to the end of the input message and padding the message with "0"s and adding the length of the message as a big-endian.

6. The method as defined in claim 1 further comprising putting the final results for each message into an eight slot 32-bit rotating array/cipher.

7. The method as defined in claim 1 further comprising adding the final results of each message together and providing the first seven words as a resulting cryptographic hash function.

8. A system for generating a surrogate key using cryptographic hashing comprising:
at least one processing unit;
memory operably associated with the at least one processing unit; and
a key generation system storable in memory and executable by the at least one processing unit, the key generation system comprising:
a selecting component configured to select a field that is unique among all records in the database;
an extracting component configured to extract the data from the field for each record;
a concatenating component configured to concatenate the extracted data into an input message;
a hash generator configured to hash the input message by performing the following:
breaking the input message into bit chunks;
breaking each chunk up into initial words;
rotating and shifting the initial words and generating additional words;
appending the additional words to the initial words to form a second set of words; and
forming a third set of words by operating on the second set of words at least one of the following: rotations, shifts, and Boolean functions, for each of the third set of words, adding the first 32 bits of the fractional parts of the cube roots of the first 64 prime numbers to form final results for each message; and
an outputting component configured to output a surrogate key.

9. A computer program product embodied in a computer readable storage device for operating in a system comprising a processing unit, a memory, a bus, input/output (I/O) interfaces, an application, the computer program product for implementing a method in a system for generating a surrogate key using cryptographic hashing, the method comprising:
selecting a field that is unique among all records in the database;
for each record, extracting the data from the field;
concatenating the extracted data into an input message;
inputting the input message to a hash generator to perform the following:
break the input message into bit chunks;
break each bit chunk into initial words;
rotate and shift the initial words and generating additional words and append the additional words to the initial words to form a second set of words; and
form a third set of words by operating on the second set of words at least one of the following: rotations, shifts, and Boolean functions, for each of the third set of words, adding the first 32 bits of the fractional parts of the cube roots of the first 64 prime numbers to form final results for each message; and
outputting a surrogate key.

10. The computer program product as defined in claim 9 wherein the method further comprises running the input message in batches.

11. The computer program product as defined in claim 10 wherein the method further comprises running the input message one at a time.

12. The computer program product as defined in claim 9 wherein the method further comprises determining if a bit chunk is the last chunk and, if a bit chunk is the last chunk, appending a "1" to the end of the input message and padding the message with "0"s and adding the length of the message as a big-endian.

13. A method for deploying a computing infrastructure comprising integrating computer-readable code into a computing system, wherein the code in combination with the computing system is capable of performing a process for generating a surrogate key using cryptographic hashing the process comprising:
selecting a field that is unique among all records in the database;
for each record, extracting the data from the field;
concatenating the extracted data into an input message;
inputting the input message to a hash generator to perform the following:

break the input message into bit chunks;

break each bit chunk into initial words;

rotate and shift the initial words and generating additional words and append the additional words to the initial words to form a second set of words; and form a third set of words by operating on the second set of words at least one of the following: rotations, shifts, and Boolean functions, for each of the third set of words, adding the first 32 bits of the fractional parts of the cube roots of the first 64 prime numbers to form final results for each message; and outputting a surrogate key.

14. The method as defined in claim 13 wherein the process further comprises determining if a bit chunk is the last chunk and, if a bit chunk is the last chunk, appending a "1" to the end of the input message and padding the message with "0"s and adding the length of the message as a big-endian.

* * * * *